US010393529B2

(12) United States Patent
Steward

(10) Patent No.: US 10,393,529 B2
(45) Date of Patent: Aug. 27, 2019

(54) MARINE AUTO-RANGE REMAINING OVERLAY

(71) Applicant: NAVICO HOLDING AS, Egersund (NO)

(72) Inventor: Lucas Steward, Broken Arrow, OK (US)

(73) Assignee: NAVICO HOLDING AS, Egersund (NO)

( * ) Notice: Subject to any disclaimer, the term of this patent is extended or adjusted under 35 U.S.C. 154(b) by 57 days.

(21) Appl. No.: 15/642,865

(22) Filed: Jul. 6, 2017

(65) Prior Publication Data

US 2019/0011266 A1 Jan. 10, 2019

(51) Int. Cl.
*G01C 21/20* (2006.01)
*B63B 49/00* (2006.01)
*B63J 99/00* (2009.01)

(52) U.S. Cl.
CPC ............ *G01C 21/203* (2013.01); *B63B 49/00* (2013.01); *B63B 2213/00* (2013.01); *B63J 2099/008* (2013.01)

(58) Field of Classification Search
CPC ... G01C 21/203; B63B 49/00; B63B 2213/00; B63J 2099/008
See application file for complete search history.

(56) References Cited

U.S. PATENT DOCUMENTS

| 7,268,703 | B1 | 9/2007 | Kabel et al. | |
|---|---|---|---|---|
| 2014/0200806 | A1* | 7/2014 | Carnevali | G01C 21/203 701/533 |
| 2015/0142305 | A1* | 5/2015 | Kubo | G09B 29/106 701/439 |

OTHER PUBLICATIONS

Simrad—TripIntel "Application note", retrieved from <https://www.simrad-yachting.com/Root/Simrad-Documents/TripIntel_Application-Note.pdf>, Date Accessed: Aug. 17, 2017.
Simrad: Simrad E50xx ECDIS system; retrieved from <http://wwvv.navico-commercial.com/en-US/Recommended-Products/Patrol-Vessels/ECDIS/E5024-ECDIS-system-en-us.aspx>, Date Accessed: Aug. 17, 2017.
Martek Marine Innovative Ship Solutions: "A Guide to Electronic Charts Finding the Best Licensing Solution for your Ships" retrieved from <http://www.ecdis-info.com/media/Guides/iecdis-enc-guide.pdf> > Date Accessed: Aug. 17, 2017.

* cited by examiner

*Primary Examiner* — Yuen Wong
(74) *Attorney, Agent, or Firm* — Nelson Mullins Riley & Scarborough LLP

(57) ABSTRACT

Apparatuses and methods are provided herein for performing marine auto-ranging. Marine auto-ranging may include the functionality to determine current conditions associated with a watercraft (e.g., remaining fuel, location, speed, wind, current, etc.) and determine a range for the watercraft and, in turn, possible destinations for the watercraft that are within range on a map. A marine electronic device may be configured to display a map and overlay the map with an indication of how far a watercraft could travel based on such current conditions, such as a highlighted or shaded geographical area around a current location of the watercraft on the map.

20 Claims, 6 Drawing Sheets

MARINE AUTO-RANGE REMAINING OVERLAY

FIELD OF THE INVENTION

Embodiments of the present invention relate generally to marine technology and, more particularly, to marine navigation technology.

BACKGROUND OF THE INVENTION

Vehicles, including boats and other watercraft, often include a fuel gauge to provide a driver with an indication of how much fuel is left to propel the vehicle. The driver can use this gauge to determine when refueling or a return to a launch point may be necessary. While such a fuel gauge can provide some assistance to a driver to determine when fuel is running low, such gauges provide very limited and remedial information to the driver thereby limiting a driver's ability to efficiently manage fuel usage during a trip.

BRIEF SUMMARY OF THE INVENTION

According to some example embodiments, apparatuses and methods are provided herein for performing marine auto-ranging. Marine auto-ranging may include the functionality to determine current conditions associated with a watercraft (e.g., remaining fuel, location, speed, wind, current, etc.) and determine a range for the watercraft and, in turn, possible destinations for the watercraft that are within range on a map. In this regard, according to some example embodiments, a marine electronic device may be configured to display a map and overlay the map with an indication of how far a watercraft could travel based on current conditions. The indication of how far a watercraft is capable of traveling may be a provided on the map as a highlighted or shaded geographical area around a current location of the watercraft on the map. The indication, as a map overlay, may be determined based on various factors, including but not limited to, the current geographic location, the remaining fuel amount (e.g., gasoline or battery level), cartographic data (e.g., water depths), current or planned boat speed, wind speed and direction, tidal levels, wave heights, no wake zones, and/or water currents.

In an example embodiment, a marine electronics device is provided. The marine electronics device comprises position sensing circuitry configured to determine a current geographic location of a watercraft associated with the marine electronics device and output a location signal indicative of the geographic location. The marine electronics device also includes a display. The marine electronics device further includes processing circuitry configured to receive the location signal indicating the geographic location of the watercraft and receive a remaining fuel signal from a fuel quantity detector indicating an amount of fuel remaining for operating a motor of the watercraft. The processing circuitry is further configured to generate a plurality of possible destinations based on the geographic location, the amount of fuel remaining, and cartographic data. The processing circuitry is further configured to render an indication of the plurality of possible destinations at their respective geographic locations on the display as an overlay to a map to visually communicate the plurality of possible destinations to a user to indicate travel options for the watercraft from the geographic location that are within a remaining fuel range of the watercraft.

In some embodiments, the processing circuitry is further configured to generate the plurality of possible destinations based on a depth of the watercraft.

In some embodiments, the fuel quantity detector comprises a gasoline fuel tank level sensor or a battery charge level sensor.

In some embodiments, the processing circuitry is further configured to generate the plurality of possible destinations based on at least one of wind speed and direction, tide level, wave height, or currents.

In some embodiments, the processing circuitry is further configured to generate the plurality of possible destinations based on at least one of no wake zones or speed limits.

In some embodiments, the processing circuitry is further configured to generate the plurality of possible destinations based on a determined amount of fuel required to return to a starting point or travel to a defined waypoint after traveling to one of the plurality of possible destinations.

In some embodiments, the processing circuitry is further configured to generate an updated plurality of possible destinations and trigger an alert in response to at least one of the possible destinations being at least a threshold difference from one of the updated possible destinations.

In some embodiments, the map is a navigation chart.

In some embodiments, the overlay includes a plurality of colors associated with respective percentages of fuel remaining at given points.

In another example embodiment, a computer program product is provided. The computer program product comprises a non-transitory computer readable storage medium and computer program instructions stored therein. The computer program instructions comprises program instructions that configure processing circuitry to receive a location signal from position sensing circuitry indicating the geographic location of a watercraft and receive a remaining fuel signal from a fuel quantity detector indicating the amount of fuel remaining for operating a motor of the watercraft. The computer program instructions are further configured to cause the processing circuitry to generate a plurality of possible destinations based on the geographic location, the amount of fuel remaining, and cartographic data. The computer program instructions are further configured to cause the processing circuitry to render an indication of the plurality of possible destinations at their respective geographic locations on a display as an overlay to a map to visually communicate the plurality of possible destinations to a user to indicate travel options for the watercraft from the geographic location that are within a remaining fuel range of the watercraft.

In some embodiments, the fuel quantity detector comprises a gasoline fuel tank level sensor or a battery charge level sensor.

In some embodiments, the program instructions that configure the processing circuitry to generate the plurality of possible destinations include program instructions that configure the processing circuitry to generate the plurality of possible destinations based on at least one of wind speed and direction, tide level, wave height, or currents.

In some embodiments, the program instructions that configure the processing circuitry to generate the plurality of possible destinations include program instructions that configure the processing circuitry to generate the plurality of possible destinations based on at least one of no wake zones or speed limits.

In some embodiments, the program instructions that configure the processing circuitry to generate the plurality of possible destinations include program instructions that configure the processing circuitry to generate the plurality of possible destinations based on a determined amount of fuel required to return to a starting point or travel to a defined waypoint after traveling to one of the plurality of possible destinations.

In some embodiments, the computer program product further comprises program instructions that configure the processing circuitry to generate an updated plurality of possible destinations and trigger an alert in response to at least one of the possible destinations being at least a threshold difference from one of the updated possible destinations.

In some embodiments, the computer program product further comprise program instructions that configured the processing circuitry to render the indication of the plurality of possible destinations, wherein the overlay includes a plurality of colors associated with respective percentages of fuel remaining at given points.

In yet another example embodiment, a method is provided. The method comprises determining a current geographic location of a watercraft associated with a marine electronics device and receiving, at processing circuitry, a location signal indicating the geographic location of the watercraft. The method further comprises receiving, at processing circuitry, a remaining fuel signal from a fuel quantity detector indicating an amount of fuel remaining for operating a motor of the watercraft. The method further comprises generating a plurality of possible destinations based on the geographic location, the amount of fuel remaining, and cartographic data. The method further comprises rendering an indication of the plurality of possible destinations at their respective geographic locations on the display as an overlay to a map to visually communicate the plurality of possible destinations to a user to indicate travel options for the watercraft from the geographic location that are within a remaining fuel range of the watercraft.

In some embodiments, generating the plurality of possible destinations includes generating the plurality of possible destinations based on at least one of wind speed and direction, tide level, wave height, or currents.

In some embodiments, generating the plurality of possible destinations includes generating the plurality of possible destinations based on at least one of no wake zones or speed limits.

In some embodiments, generating the plurality of possible destinations includes generating the plurality of possible destinations based on a determined amount of fuel required to return to a starting point or travel to a defined waypoint after traveling to one of the plurality of possible destinations.

BRIEF DESCRIPTION OF THE DRAWINGS

Figure 1:
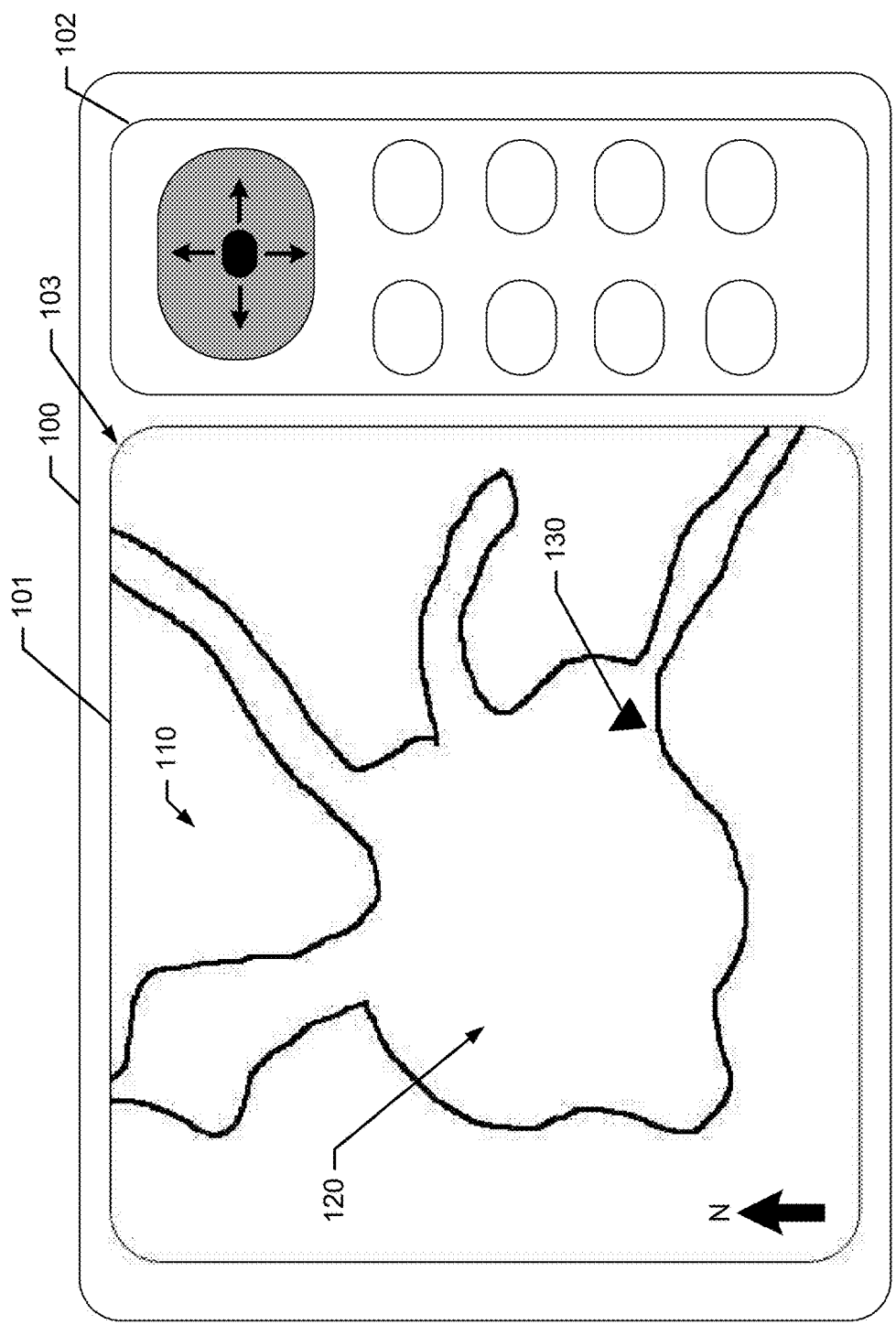
Figure 2A:
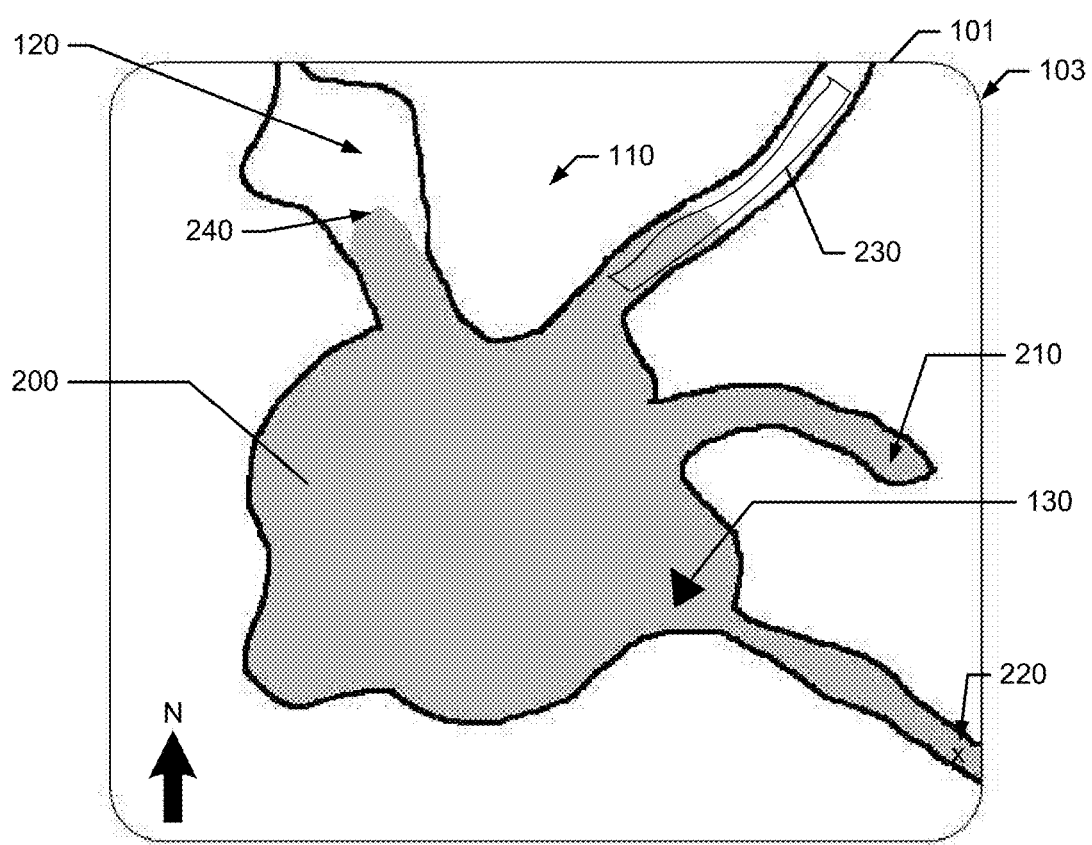
Figure 2B:
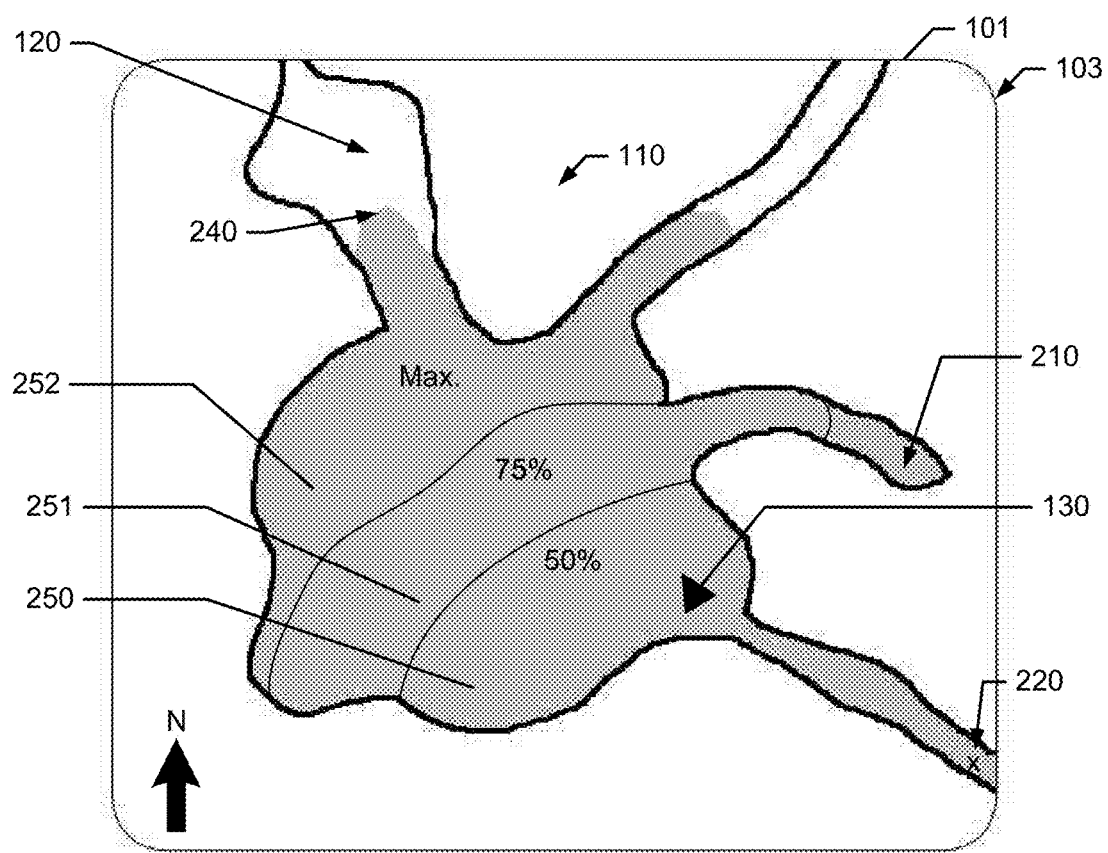
Figure 3:
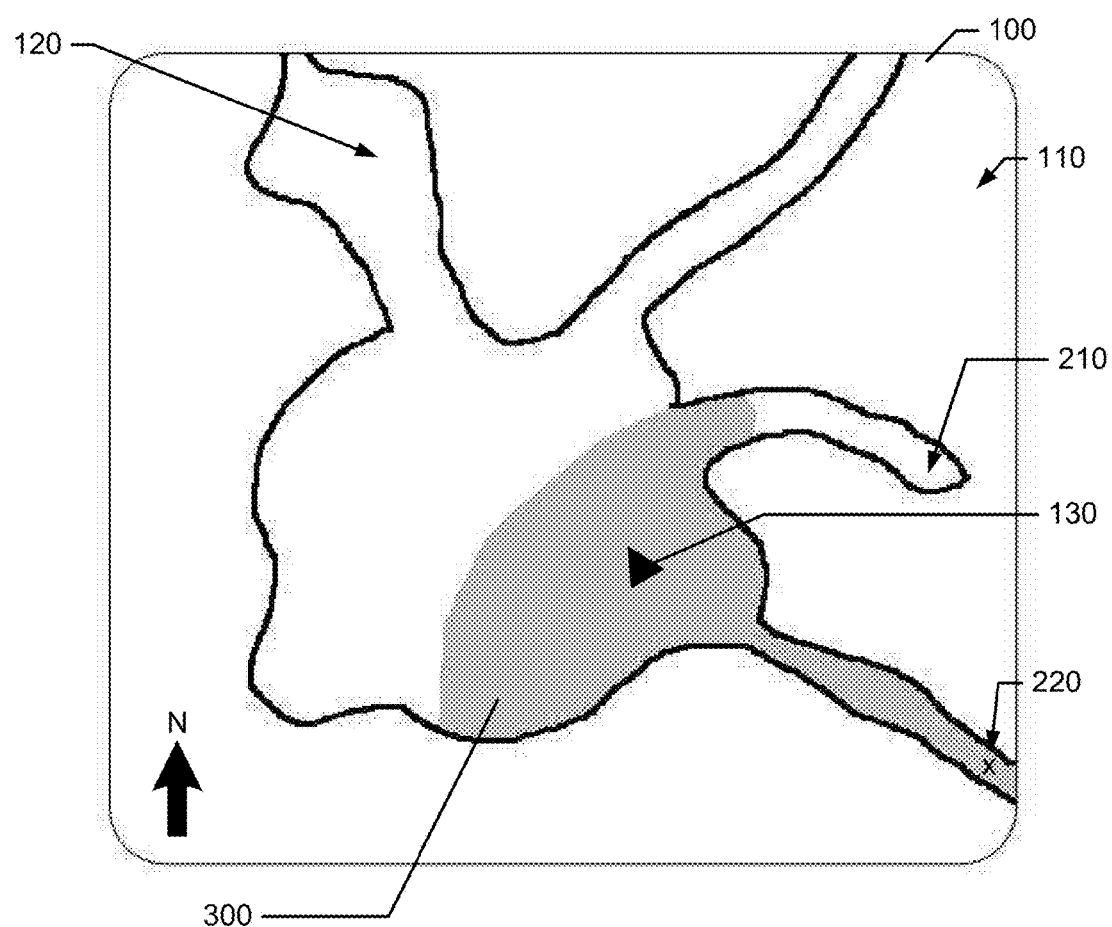
Figure 4:
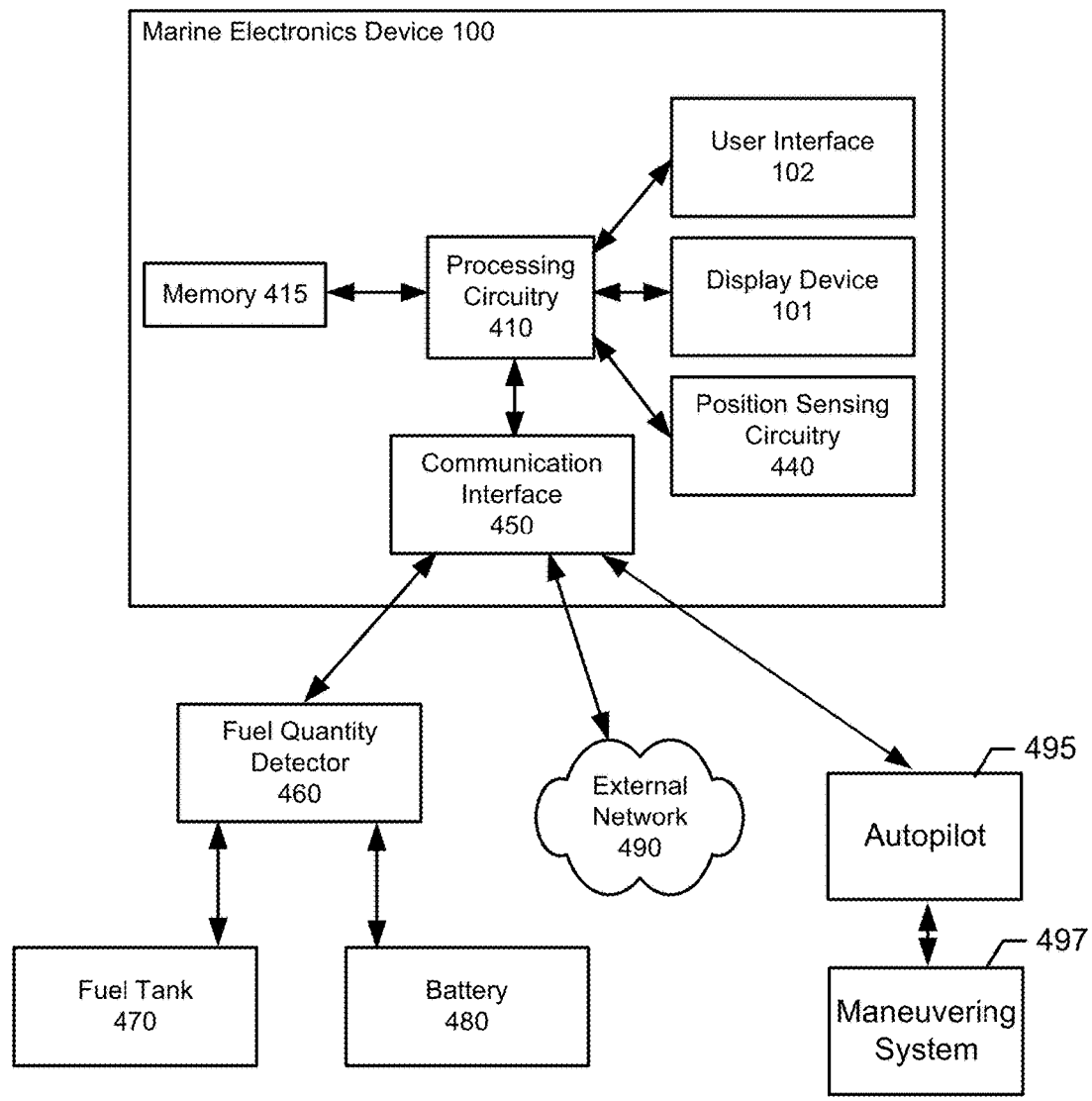
Figure 5:
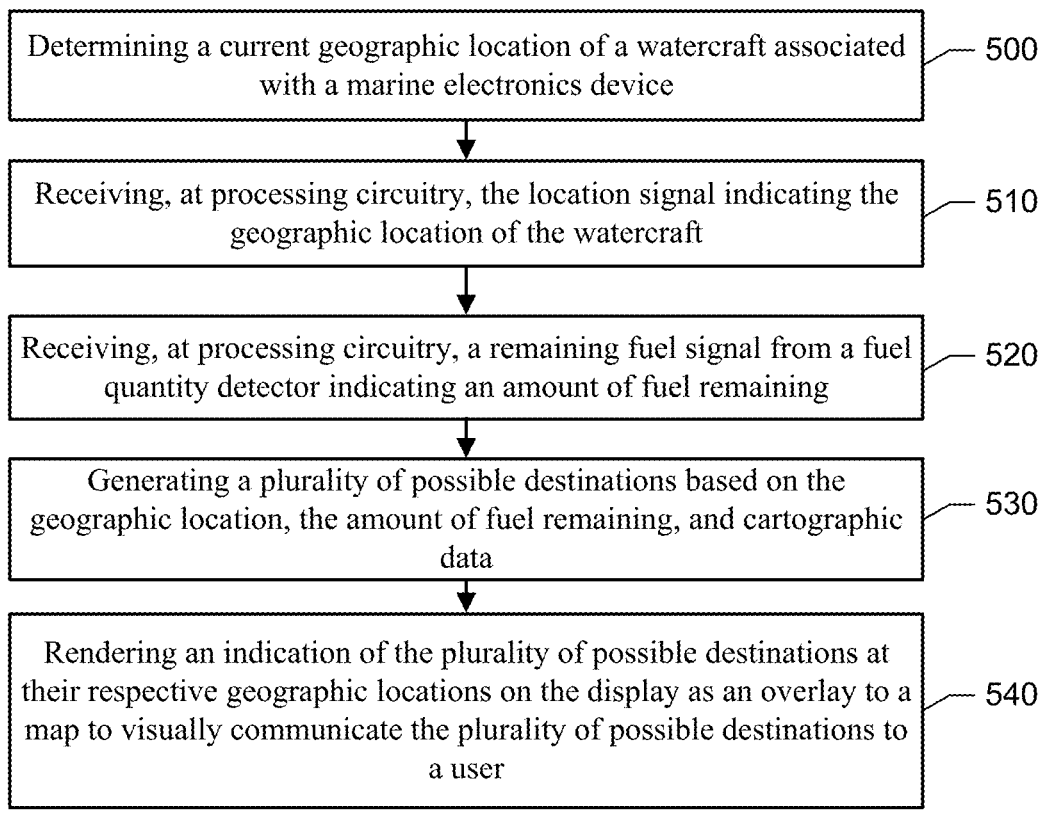

Having thus described some example embodiments in general terms, reference will now be made to the accompanying drawings, which are not necessarily drawn to scale, and wherein:

FIG. 1 shows an example marine electronics device with a display rendering a map in accordance with some example embodiments;

FIG. 2A shows an example display with a rendered map and an auto-ranging overlay in accordance with some example embodiments;

FIG. 2B shows an example display with a rendered map and a number of auto-ranging overlay portions based on fuel thresholds in accordance with some example embodiments;

FIG. 3 shows another an example display with a rendered map and an auto-ranging indication in accordance with some example embodiments;

FIG. 4 shows a block diagram for an marine electronics device in accordance with some example embodiments; and FIG. 5 shows a flowchart of an example method for marine auto-ranging in accordance with some example embodiments.

DETAILED DESCRIPTION

Exemplary embodiments will be described more fully hereinafter with reference to the accompanying drawings, in which some, but not all embodiments of the invention are shown. Indeed, the embodiments take many different forms and should not be construed as being limiting. Rather, these example embodiments are provided so that this disclosure will satisfy applicable legal requirements. Like reference numerals refer to like elements throughout.

FIG. 1 shows an example marine electronic device 100 (or multi-function display) that includes a display device 101 and a user interface 102. As further described below, an example marine electronic device 100 is also depicted in a functional component block diagram form in FIG. 4. The display device 101 may be any type of visual display or monitor such as, for example, an LCD display. According to some example embodiments, the display device 101 may be a touch screen display capable of sensing a user's touch as a user interface input and may therefore be part of the user interface 102. The user interface 102 may include a number of controls that permit a user to interact with the marine electronic device 100 and provide commands to, and receive feedback from, the marine electronic device 100. The controls of the user interface 102 may include buttons and a movement control, such as for example, a directional touch-pad or the like.

According to some example embodiments, the display 101 in FIG. 1 is rendering a map 103, which may be a nautical chart. The map 103 may include one or more land areas 110 and water areas 120. The map 103 may also show the current location of a watercraft 130 associated with the marine electronic device 100. To do so, the marine electronic device 100 may include position sensing circuitry 440 (e.g., a GPS module) that is capable of determining a geographic location of the watercraft and providing that information to processing circuitry 410 for rendering on the display 101 and the map 103. In some embodiments, the position sensing circuitry 440 may be configured to output a location signal to, for example, the processing circuitry 410, indicative of the geographic location of the marine electronic device 100 and the associated watercraft.

FIG. 2A shows the display device 101 rendering the map 103 and an auto-ranging overlay 200, according to some example embodiments. The auto-ranging overlay 200 may be rendered to indicate to a user some or all of the possible destinations for a watercraft given various current conditions, including the amount of remaining fuel. The auto-ranging overlay 200 may define an area within which the watercraft has sufficient fuel to reach. In locations where the auto-ranging overly 200 ends, such as at location 240, it can be interpreted that these locations are the maximum distance that the watercraft can travel under the current conditions. Locations within the auto-ranging overlay 200, such as location 210, may be reached by the watercraft and, in some cases, additional fuel may be remaining to travel further from that location.

Parameters that may be considered in determining the auto-ranging overlay 200 may be, for example, the current location of the watercraft (e.g., as determined via the position sensing circuitry 440) and cartographic data (e.g., topology data, water depth data, etc.). Based on these and possibly other parameters, a plurality of possible destinations may be determined and translated into a visual rendering in the form of the auto-ranging overlay 200 on the map 103. Location 210 may be an intended destination for the user, and the auto-ranging overlay 200 of FIG. 2A indicates that location 210 is within reach of the watercraft.

An example algorithm for determining the plurality of possible destinations may be to determine a current location of the watercraft. Additionally, an amount of remaining fuel may be determined and, in some embodiments, an expected speed or throttle for movement of the watercraft may be determined (e.g., via a user input of the expected speed, based on an average speed for the current trip, or based on a current speed that the watercraft is moving). Based on the expected speed or throttle, a unit distance per unit fuel may be determined (e.g., miles per gallon). Using this ratio, a maximum possible travel distance may be determined. This maximum possible travel distance may be plotted on a map in all directions from the current location of the watercraft. However, since a watercraft cannot travel on land or in shallow water, some plotted options may be removed using the cartographic data (e.g., stored in the memory 415), thereby determining the plurality of possible destinations.

In some embodiments, following from the example algorithm, the amount of remaining fuel may be determined by the marine electronic device 100, such as via a fuel quantity detector 460 of FIG. 4. In this regard, in some embodiments, the watercraft may have gas-powered propulsion (e.g., gas-powered engine) and a fuel tank 470. The fuel quantity detector 460 may, for example, comprise a float in the fuel tank or other fuel tank level sensor that facilitates measuring a fuel level in the fuel tank from the floor of the fuel tank and thereby indicating the amount of remaining fuel in the tank. Additionally or alternatively, the watercraft may have electrically-powered propulsion (e.g., an electric motor) and a battery 480. In this instance, the fuel quantity detector 460 may include a battery charge level sensor and may be configured to measure the amount of energy stored in the battery to determine a remaining amount of fuel. Techniques for determining the amount of energy in a battery may include determining, for example, a short circuit current, an open circuit voltage, a current through or a voltage across a known load, or the like. The fuel quantity detector 460 may be configured to relay the information regarding the remaining fuel quantity to the marine electronic device 100 processing circuitry 410 via the communication interface 450.

In some embodiments, in addition to geographic location, the amount of remaining fuel, and cartographic data, other parameters may be considered when generating the auto-ranging overlay 200. For example, weather conditions may be considered. In this regard, for example, wind speed and direction may be considered, since wind speed and direction may have an impact on the distance a watercraft can travel (e.g., into the wind or downwind) on a given amount of fuel. Wind speed and direction information may be determined from a weather station on board the watercraft or via information communicated to the marine electronic device 100 wirelessly from a weather information source (e.g., the National Weather Service). In some embodiments, the tide levels, the movement of the tides, and the water currents may be considered, since again, these parameters may have an effect on the distance a watercraft can travel on a given amount of fuel. The tide levels and movement of the tides may be determined, in some embodiments, based on the current location of the watercraft and the current date and time. The currents may also be a function of the date and time, but in some instances, such as in a river, the currents may be relatively static and be received from a marine information service. According to some example embodiments, the tide level and movement information may be received wirelessly by the marine electronic device 100 for a marine information service. Further, the tide levels and movement may also impact the water depth, thereby possibly increasing or decreasing the possible destinations. The seas and wave heights may also be considered and this information may be received, for example, from a marine information service. According to some example embodiments, wirelessly received information may be received via the communications interface 450 of the marine electronic device 100 via, for example, an external network 490, such as, the Internet. While these environmental parameters provide some additional parameters that may be considered in the generation of an auto-ranging overlay, additional environmental parameters may also be considered.

Additionally, legal parameters may be considered in the generation of an auto-ranging overlay 200. In this regard, for example, the speed limits, no wake zones, legally recognized swimming or protected wildlife areas, or the like may be considered. This type information may be obtained from, for example, cartographic data stored in the memory 415. With respect to legal parameters that affect speed of travel, according to some example embodiments, the distance that a watercraft can travel from a given location may, for example, increase because the speed of the watercraft may be reduced in these areas and the fuel consumption efficiency may increase (or decrease). Referring to the map 103 of FIG. 2A, a no wake zone 230 is defined on the map 103. Accordingly, that maximum speed may be considered as, for example, idle speed, and therefore the destinations impacted by the presence of the no wake zone 230 may be increased due to the increased fuel efficiency introduced by the speed limitations of the no wake zone. Similar impacts to the auto-ranging overlay 200 may occur as a result of considering speed limits. Further, since travel to legally defined swimming areas or protected wildlife areas may not be permitted, these areas may be removed from the plurality of possible destinations, and may further affect an ability to reach other destinations because a travel path may need to be routed around these areas thereby potentially reducing the range to certain destinations.

According to some example embodiments, yet another parameter that may be considered in determining the auto-ranging overlay 200 is a defined starting point or a waypoint. With respect to a starting point, for example location 220 on the map 103, the analysis of the auto-ranging overlay 200 may involve returning to the starting point (e.g., "put in" point). As such, some portion of the remaining fuel may be allocated to returning to the starting point thereby limiting the distance that a watercraft may travel from its current location and, in turn, the auto-ranging overlay 200. The starting point 220 may be set, for example, by a user of the marine electronic device 100 via the user interface 102 or the starting point may be detected via position sensing circuitry 440 (e.g., the location where the marine electronic device 100 transitioned from being on land to on water). Similarly, according to some example embodiments, location 220 may be a refueling location and the auto-ranging overlay 200 may be defined to inform the user how far away from the refueling location the watercraft can travel and still have sufficient fuel to return to the refueling station. In some embodiments, location 220 may be a waypoint (e.g., a desired intermediate destination) that the user desires to travel to and the auto-ranging overlay 200 may be defined such that travel to the waypoint is considered, thereby limiting travel relative to the waypoint.

According to some example embodiments, the auto-ranging overlay 200 may be generated based on a number of remaining fuel thresholds. In this regard, as mentioned above, the extents of the auto-ranging overlay 200 may define locations where the maximum range from a current location is located. However, additional ranges may be defined based on different amounts of remaining fuel. For example, 75% and 50% thresholds may be defined. As such, another auto-ranging overlay may be defined where 75% of the current amount of remaining fuel would be expended. Similarly, another auto-ranging overlay may be defined where 50% of the current amount of remaining fuel would be expended. Each of these thresholds may be rendered as a separate auto-ranging overlay portion having, for example, a different defined area or a different color. Referring to FIG. 2B, the area 252 between maximum and 75% may be red, the area 251 between 75% and 50% may be yellow, and the area 250 between 50% and the current location may be green. Accordingly, with this functionality, a user that wishes to maintain some level of reserve fuel can still understand the possible destinations that are currently available to the watercraft while maintaining that reserve amount.

Further, according to some example embodiments, the auto-ranging overlay 200 may be updated periodically or in response to an event. Referring now to FIG. 3, due to changing conditions (e.g., change of wind speed and direction) and movement of the watercraft 130, the auto-ranging overlay 200 has changed via an update to the auto-ranging overlay 300. As can be seen, the intended destination of the user, i.e., location 210, is no longer available due to the changing conditions. According to some example embodiments, the marine electronic device 100 may update the parameter values upon which the auto-ranging overlay is generated, and generate an updated plurality of possible destinations for rending on the display device 101. According to some example embodiments, if a threshold difference in the updated plurality of possible destinations is determined (e.g., if the maximum distance changes by a threshold amount) then an alert may be triggered to inform the user of the changing conditions. According to some example embodiments, if a user has set a particular destination in the marine electronic device 100, and that destination is no longer one of the plurality of possible destinations due to changing conditions, then an alert may be triggered. The alert may be provided as a message on the display device 101, an audible sound via a speaker of the marine electronic device 100, or other form of user feedback.

In some embodiments, the marine electronic device 100 may be configured to communicate with and/or control operation of one or more autopilots (e.g., autopilot 495), such as to cause the watercraft to travel to a waypoint or other destination. In some embodiments, a user may interact with the overlay 200 to select a destination. In response, the marine electronic device 100 may cause the watercraft to travel to the selected destination, such as by using the autopilot 495.

Example System Architecture

As mentioned above, FIG. 4 shows a block diagram of the example marine electronic device 100. In this regard, the marine electronic device 100 may include processing circuitry 410, a memory 415, a communication interface 450, user interface 102, display device 101, and position sensing circuitry 440. Further, via the communications interface 450, the marine electronic device 100 may interface with a fuel quantity detector 460, which may, in turn, interface with one or both of a fuel tank 470 and a battery 480. The communications interface 450 may also interface with an external network 490. In some embodiments, the communications interface 450 may interface with an autopilot 495 and/or a maneuvering system 497.

The processing circuitry 410 may be any means configured to execute various programmed operations or instructions stored in a memory device such as a device or circuitry operating in accordance with software or otherwise embodied in hardware or a combination of hardware and software (e.g., a processor or processing circuitry operating under software control or the processor or processing circuitry embodied as an application specific integrated circuit (ASIC) or field programmable gate array (FPGA) specifically configured to perform the operations described herein, or a combination thereof) thereby configuring the device or circuitry to perform the corresponding functions of the processing circuitry 410 as described herein. In this regard, the processing circuitry 410 may be configured to analyze signals from, or drive signals to, directly or indirectly, other components, such as, the memory 415, the user interface 102, the display device 101, the position sensing circuitry 440, and the communications interface 450.

The memory 415 may be configured to store instructions, computer program code, cartographic data, marine data, chart data, location/position data, fuel data and other data in a non-transitory computer readable medium for use, such as by the processing circuitry 410.

The communication interface 450 may be configured to enable connection to external systems (e.g., fuel quantity detector 460, external network 490, autopilot 495). In this manner, the processing circuitry 410 may retrieve remaining fuel quantity data from the fuel quantity detector 460. Communication interface 450 may be configured to communicate via a number of different communication protocols and layers. For example, the links between the communication interface 450 and other device may be any type of wired or wireless communication link. For example, communications between the interfaces may be conducted via Bluetooth, Ethernet, the NMEA 2000 framework, cellular, WiFi, or other suitable networks.

The autopilot 495 may include processing circuitry, such as a processor and a memory, configured to operate the maneuvering system 497. The autopilot 495 may be configured to operate the maneuvering system automatically, e.g. without user interaction, causing watercraft to travel, such as to a selected waypoint. The autopilot 495 may generate instructions based on a current position, a programmed route, or the like to operate the maneuvering system 497.

The maneuvering system 497 may include one or more propulsion motors, or engines, including but not limited to, outboard motors, inboard motors, trolling motors, main engines, emergency propulsion motors, or the like. Additionally, the maneuvering system 497 may include one or more control surfaces, such as rudders, planes, or the like configured to steer the vehicle.

According to various example embodiments, the processing circuitry 410 may operate to control the functionality of the marine electronic device 100, particularly with respect to generating an auto-ranging overlay and determining a plurality of possible destinations as described herein. In this regard, processing circuitry 410 may be configured to perform some or all of the functions described with respect to functionalities of the marine electronic device 100, in some instances with the assistance of the memory 415 storing computer program instructions, as described above and otherwise herein.

In this regard, the processing circuitry 410 may be configured to receive a location signal indicating the geographic location of a watercraft. The location signal may be provided by the position sensing circuitry 440. The position sensing circuitry 440 may be configured to determine a current geographic location of the watercraft associated with the marine electronics device 100, and output a location signal indicative of the geographic location. The processing circuitry 410 may also be configured to receive a remaining fuel signal from the fuel quantity detector 460 indicating an amount of fuel remaining for operating a motor of the watercraft and generate a plurality of possible destinations based on the geographic location, the amount of fuel remaining, and cartographic data. The processing circuitry 410 may also be configured to render, on the display device 101 an indication of the plurality of possible destinations at their respective geographic locations as an overlay to a map to visually communicate the plurality of possible destinations to a user to indicate travel options for the watercraft form the geographic location.

According to some example embodiments, the processing circuitry 410 may be further configured to generate the plurality of possible destinations based on a water depth indicated by the cartographic data. According to some example embodiments, the processing circuitry 410 may be further configured to generate the plurality of possible destinations based on wind speed and direction, tide level, wave height, or currents. The processing circuitry 410 may also be configured to generate the plurality of possible destinations based legal parameters such as, no wake zones or speed limits. Further, according to some example embodiments, the processing circuitry 410 may be further configured to generate the plurality of possible destinations based on a determined amount of fuel required to return to a starting point or travel to a defined waypoint. According to some example embodiments, the processing circuitry 410 may be further configured to generate an updated plurality of possible destinations, and trigger an alert in response to at least one of the possible destinations being at least a threshold distance from one of the updated possible destinations. According to some example embodiments, the processing circuitry 410 may also be configured to render the indication of the plurality of possible destinations, where the overlay includes a plurality of colors associated with respective percentages of fuel remaining at given points.

Example Flowchart(s)

Example embodiments also include methods for generating an auto-ranging overlay as shown in FIG. 5 and in the associated description. In this regard, FIG. 5 illustrates a flowchart of various operations that may, for example, be performed by, with the assistance of, or under the control of one or more of the processing circuitry 410, or with other associated components described with respect to FIG. 5 or otherwise herein and these components may therefore constitute means for performing the respective operations.

In this regard, the example method may include determining a current geographic location of a watercraft associated with a marine electronics device at 500, and receiving, at processing circuitry, a location signal indicating the geographic location of the watercraft, at 510. The example method may further comprise, at 520, receiving, at processing circuitry, a remaining fuel signal from a fuel quantity detector indicating an amount of fuel remaining for operating a motor of the watercraft, and, at 530, generating a plurality of possible destinations based on the geographic location, the amount of fuel remaining, and cartographic data. Finally, at 540, the example method may comprise rendering an indication of the plurality of possible destinations at their respective geographic locations on the display as an overlay to a map to visually communicate the plurality of possible destinations to a user to indicate travel options for the watercraft form the geographic location.

According to some example embodiments, generating the plurality of possible destinations at 530 may include generating the plurality of possible destinations based on environmental parameters such as wind speed and direction, tide level, wave height, currents, or legal parameters, such as no wake zones or speed limits. According to some example embodiments, generating the plurality of possible destinations at 530 may include generating the plurality of possible destinations based on a determined amount of fuel required to return to a starting point or travel to a defined waypoint. According to some example embodiments, the example method may further include generating an updated plurality of possible destinations, and triggering an alert in response to at least one of the possible destinations being at least a threshold difference from one of the updated possible destinations. According to some example embodiments, the example method may include rendering the indication of the plurality of possible destinations, where the overlay includes a plurality of colors associated with respective percentages of fuel remaining at given points.

FIG. 5 and the associated description illustrates a collection of operations of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by, for example, the memory 415 and executed by, for example, the processing circuitry 410. As will be appreciated, any such computer program product may be loaded onto a computer or other programmable apparatus to produce a machine, such that the computer program product including the instructions which execute on the computer or other programmable apparatus creates means for implementing the functions specified in the flowchart block(s). Further, the computer program product may comprise one or more non-transitory computer-readable mediums on which the computer program instructions may be stored such that the one or more computer-readable memories can direct a computer or other programmable device to cause a series of operations to be performed on the computer or other programmable apparatus to produce a computer-implemented process such that the instructions which execute on the computer or other programmable apparatus implement the functions specified in the flowchart block(s).

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

The invention claimed is:

1. A marine electronics device comprising:
a position sensor configured to:
   determine a current geographic location of a watercraft associated with the marine electronics device, and
   output a location signal indicative of the current geographic location;
a display;
a processor; and
a memory including computer program code configured to, when executed by the processor, cause the marine electronics device to:
   receive the location signal indicating the current geographic location of the watercraft;
   receive a remaining fuel signal from a fuel quantity detector indicating an amount of fuel remaining for operating a motor of the watercraft;
   generate a plurality of possible destinations on a body of water based on the current geographic location, the amount of fuel remaining, and cartographic data;
   generate an overlay for a map, wherein the overlay comprises a continuous area on the map showing the plurality of possible destinations on the body of water at respective geographic locations, wherein the continuous area on the map corresponds to the plurality of possible destinations that are reachable for the watercraft from the current geographic location based on the amount of fuel remaining of the watercraft; and
   render the overlay on the map to visually communicate the plurality of possible destinations to a user to indicate travel options for the watercraft from the current geographic location that are within a remaining fuel range of the watercraft.

2. The marine electronics device of claim 1 wherein the computer program code is further configured to cause the marine electronics device to generate the plurality of possible destinations based on a depth of the watercraft.

3. The marine electronics device of claim 1 wherein the fuel quantity detector comprises a gasoline fuel tank level sensor or a battery charge level sensor.

4. The marine electronics device of claim 1 wherein the computer program code is further configured to cause the marine electronics device to generate the plurality of possible destinations based on at least one of wind speed and direction, tide level, wave height, or currents.

5. The marine electronics device of claim 1 wherein the computer program code is further configured to cause the marine electronics device to generate the plurality of possible destinations based on at least one of no wake zones or speed limits.

6. The marine electronics device of claim 1 wherein the computer program code is further configured to cause the marine electronics device to generate the plurality of possible destinations based on a determined amount of fuel required to return to a starting point or travel to a defined waypoint after traveling to one of the plurality of possible destinations.

7. The marine electronics device of claim 1 wherein the computer program code is further configured to cause the marine electronics device to:
   generate an updated plurality of possible destinations and a corresponding updated overlay; and
   trigger an alert in response to at least one of the plurality of possible destinations being at least a threshold difference from one of the updated plurality of possible destinations.

8. The marine electronics device of claim 1 wherein the map is a navigation chart.

9. The marine electronics device of claim 1 wherein the overlay includes a plurality of colors associated with respective percentages of fuel remaining at one or more of the plurality of possible destinations.

10. A computer program product comprising a non-transitory computer readable storage medium and computer program instructions stored therein, the computer program instructions comprising program instructions to configure a processor associated with a marine electronics device to:
   receive a location signal from a position sensor indicating a current geographic location of a watercraft;
   receive a remaining fuel signal from a fuel quantity detector indicating an amount of fuel remaining for operating a motor of the watercraft;
   generate an overlay for a map, wherein the overlay comprises a continuous area on the map showing a plurality of possible destinations on a body of water based on the current geographic location, the amount of fuel remaining, and cartographic data, wherein the overlay shows the plurality of possible destinations on the body of water at respective geographic locations, wherein the continuous area on the map corresponds to the plurality of possible destinations that are reachable for the watercraft from the current geographic location based on the amount of fuel remaining of the watercraft; and
   render the overlay on the map to visually communicate the plurality of possible destinations to a user to indicate travel options for the watercraft from the current geographic location that are within a remaining fuel range of the watercraft.

11. The computer program product of claim 10 wherein the fuel quantity detector comprises a gasoline fuel tank level sensor or a battery charge level sensor.

12. The computer program product of claim 10 wherein the program instructions are further configured to cause the processor to generate the plurality of possible destinations include program instructions that configure the processor to generate the plurality of possible destinations based on at least one of wind speed and direction, tide level, wave height, or currents.

13. The computer program product of claim 10 wherein the program instructions are further configured to cause the processor to generate the plurality of possible destinations include program instructions that configure the processor to generate the plurality of possible destinations based on at least one of no wake zones or speed limits.

14. The computer program product of claim 10 wherein the program instructions are further configured to cause the processor to generate the plurality of possible destinations include program instructions that configure the processor to generate the plurality of possible destinations based on a determined amount of fuel required to return to a starting point or travel to a defined waypoint after traveling to one of the plurality of possible destinations.

15. The computer program product of claim 10, wherein the program instructions are further configured to cause the processor to:
generate an updated plurality of possible destinations and a corresponding updated overlay; and
trigger an alert in response to at least one of the plurality of possible destinations being at least a threshold difference from one of the updated plurality of possible destinations.

16. The computer program product of claim 10, wherein the program instructions are further configured to cause the processor to render the indication of the plurality of possible destinations, wherein the overlay includes a plurality of colors associated with respective percentages of fuel remaining at one or more of the plurality of possible destinations.

17. A method comprising:
determining a current geographic location of a watercraft associated with a marine electronics device;
receiving, at a processor associated with the marine electronics device, a location signal indicating the current geographic location of the watercraft;
receiving, at the processor, a remaining fuel signal from a fuel quantity detector indicating an amount of fuel remaining for operating a motor of the watercraft;
generating a plurality of possible destinations on a body of water based on the current geographic location, the amount of fuel remaining, and cartographic data;
generating an overlay for a map, wherein the overlay comprises a continuous area on the map showing the plurality of possible destinations on the body of water at respective geographic locations, wherein the continuous area on the map corresponds to the plurality of possible destinations that are reachable for the watercraft from the current geographic location based on the amount of fuel remaining of the watercraft; and
rendering the overlay on the map to visually communicate the plurality of possible destinations to a user to indicate travel options for the watercraft from the current geographic location that are within a remaining fuel range of the watercraft.

18. The method of claim 17 wherein generating the plurality of possible destinations includes generating the plurality of possible destinations based on at least one of wind speed and direction, tide level, wave height, or currents.

19. The method of claim 17 wherein generating the plurality of possible destinations includes generating the plurality of possible destinations based on at least one of no wake zones or speed limits.

20. The method of claim 17 wherein generating the plurality of possible destinations includes generating the plurality of possible destinations based on a determined amount of fuel required to return to a starting point or travel to a defined waypoint after traveling to one of the plurality of possible destinations.

* * * * *